Dec. 14, 1965 W. OLSEN ETAL 3,223,955
TRANSFORMER CORE CONSTRUCTION AND METHOD OF PRODUCING SAME
Filed Nov. 13, 1961 6 Sheets-Sheet 1

INVENTOR.
WILLY OLSEN
BY HOWARD D. TINDALL

ATTORNEY

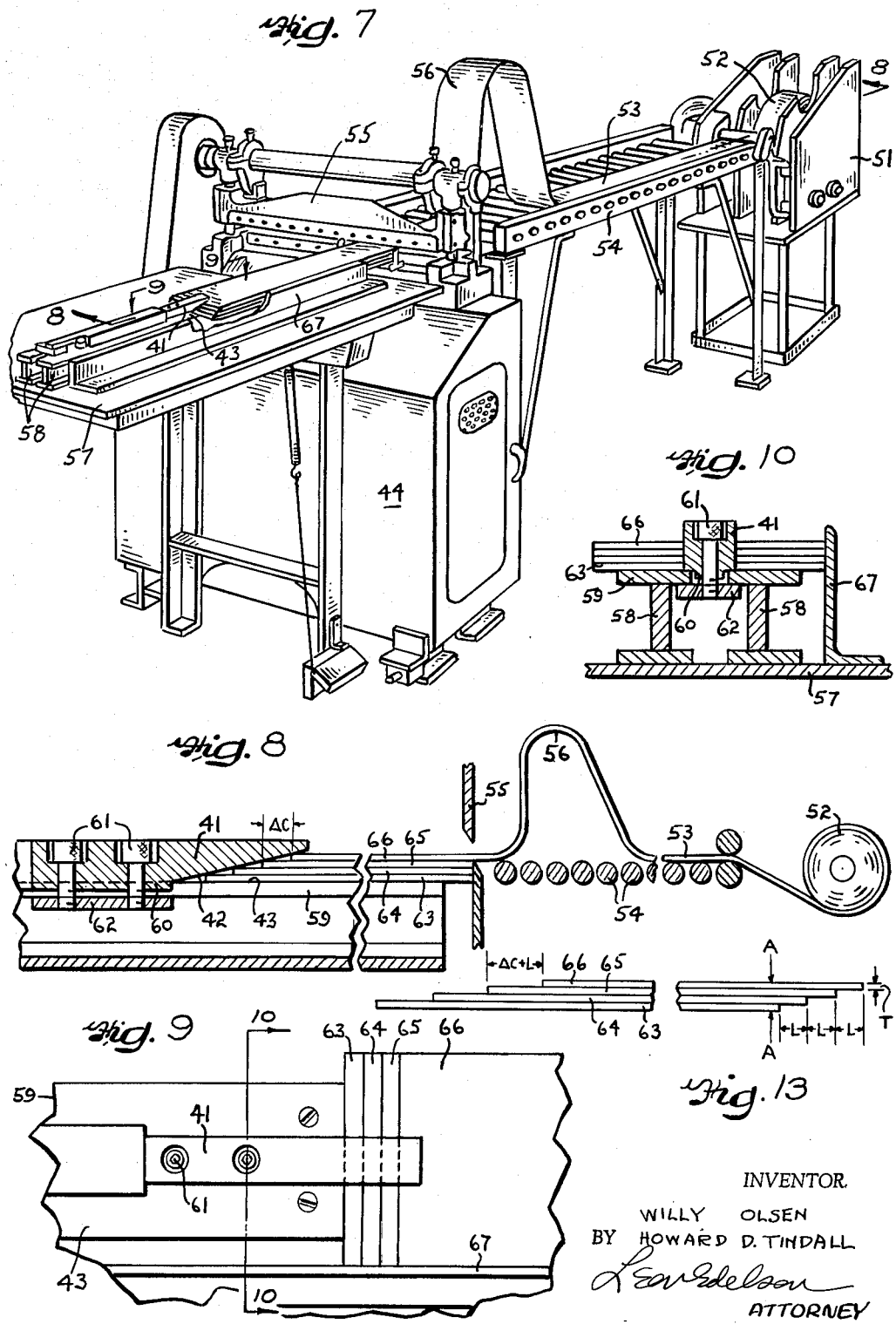

Dec. 14, 1965 W. OLSEN ETAL 3,223,955
TRANSFORMER CORE CONSTRUCTION AND METHOD OF PRODUCING SAME
Filed Nov. 13, 1961 6 Sheets-Sheet 4
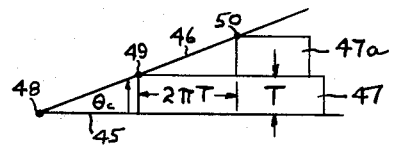
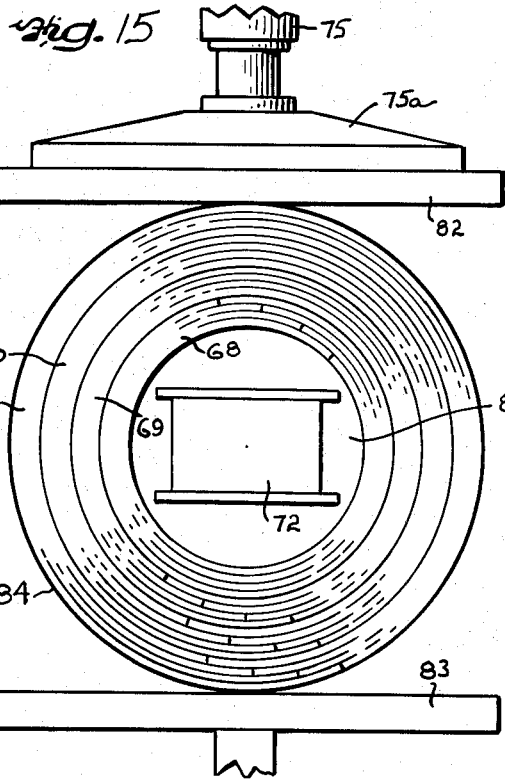
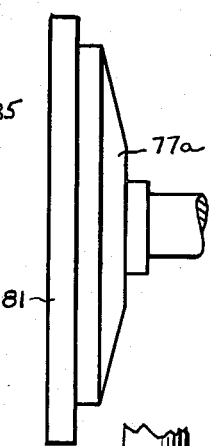
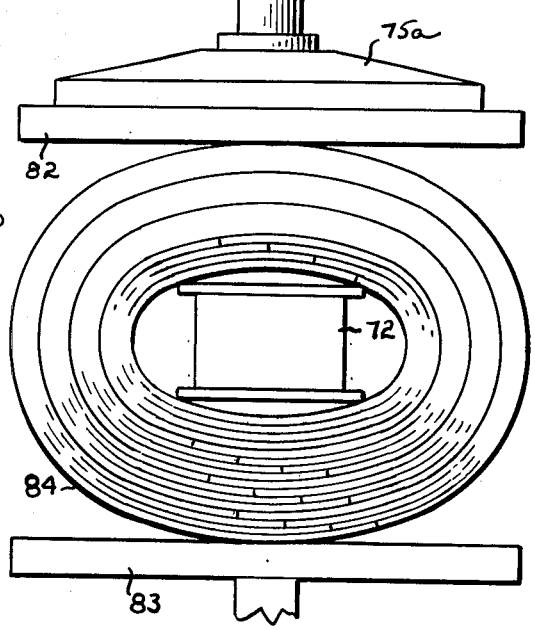
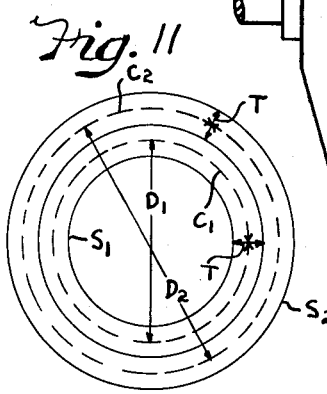
INVENTOR
WILLY OLSEN
HOWARD D. TINDALL
BY
ATTORNEY

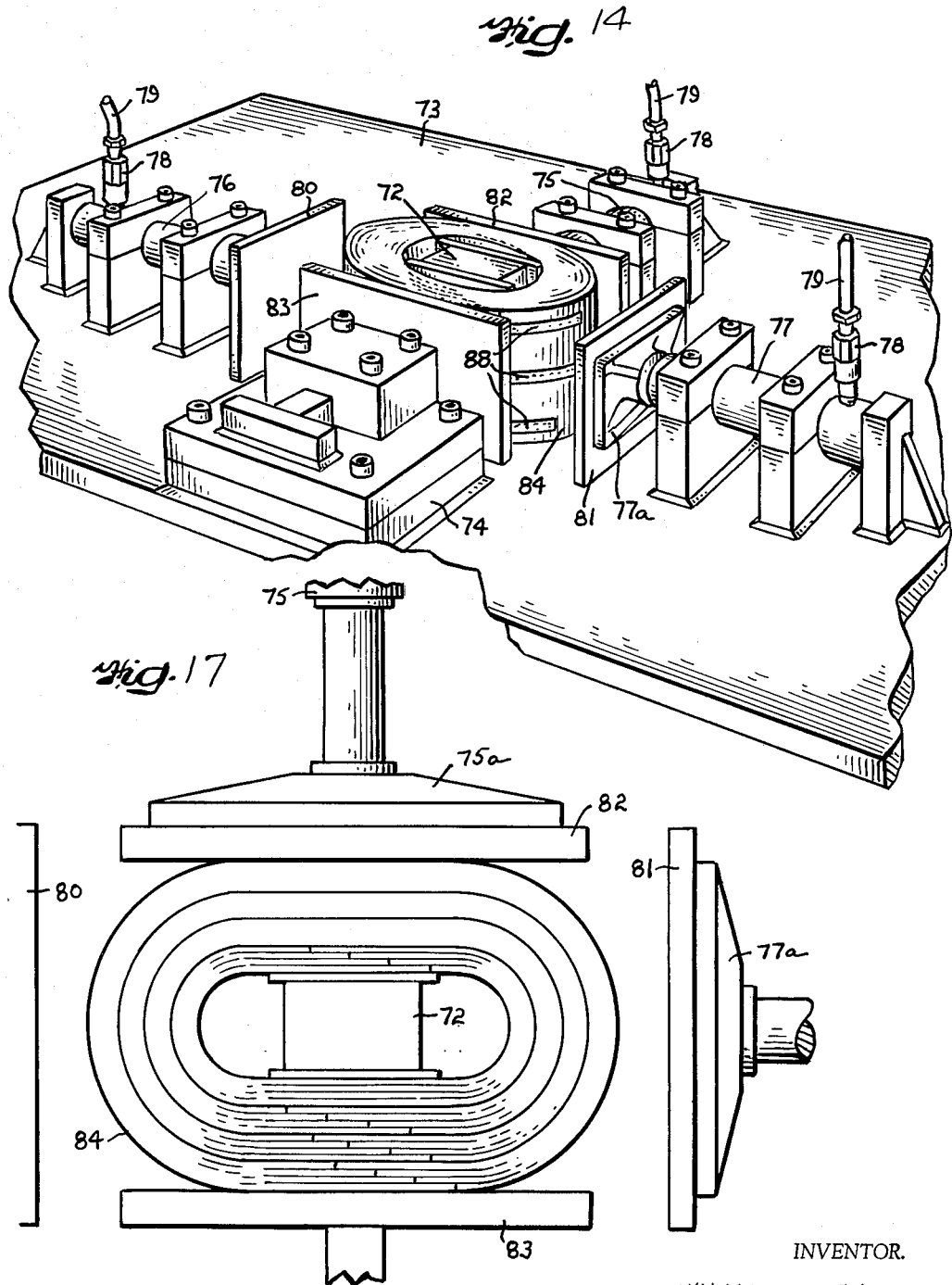

Dec. 14, 1965 W. OLSEN ETAL 3,223,955
TRANSFORMER CORE CONSTRUCTION AND METHOD OF PRODUCING SAME
Filed Nov. 13, 1961 6 Sheets-Sheet 6

INVENTOR.
WILLY OLSEN
HOWARD D. TINDALL
BY
*Leon Edelson*
ATTORNEY

United States Patent Office 3,223,955
Patented Dec. 14, 1965

3,223,955
TRANSFORMER CORE CONSTRUCTION AND METHOD OF PRODUCING SAME
Willy Olsen and Howard D. Tindall, Lynchburg, Va., assignors to H. K. Porter Company, Inc., Lynchburg, Va., a corporation of Delaware
Filed Nov. 13, 1961, Ser. No. 151,655
5 Claims. (Cl. 336—211)

This invention relates generally to wound type transformer cores, and more particularly relates to a wound transformer core having superior magnetic characteristics resulting in lower core losses and higher transformer efficiency.

The superiority of a wound transformer core as compared to cores made of solid sections or punched laminations is well-known to workers in the art and need not be detailed herein. Moreover, it is also known that a wound transformer core made from a single continuously wound strip of core material will normally exhibit better magnetic properties than a transformer core fabricated from a plurality of strips which have ends butted or lapped to form the composite core. However, as a practical matter, manufacturing economics dictate that wound cores should be made from a plurality of strips of core material rather than from a single continuous strip even though the joints inherent in such a construction tend to degrade the magnetic efficiency of the core structure. This being the case, a great deal of effort has been concentrated on ways of minimizing the deleterious effects of the joints while maintaining the manufacturing benefits which flow from the jointed type of core construction.

In nearly all instances it is desirable to form the transformer cores so that they are of rectangular or square shape and have a corresponding rectangular or square central opening or window to accommodate the transformer coil structure in order that the overall transformer may be made as compact as possible, the composite transformer usually including at least two cores each of which is disposed about one leg of the coil structure so that one leg of each core is disposed within the coil window in such manner as to cause the coil window to be substantially completely filled. This general type of transformer structure creates problems with regard to the installation of the preformed cores through the coil window since there is very little unoccupied coil window space in the finished assembly and the corners of the core structures must be passed through the window in order to close the core.

The preformed core corners are necessarily deformed by straightening in order to be passed through the window, particularly with regard to the outer laminations of the cores, with the consequent introduction of mechanical stresses and strains into the laminations of the cores. The introduced stresses alter the magnetic properties of the core in an adverse manner and are of course undesirable. This condition is aggravated in most wound core constructions by the fact that the core laminations have a high space factor at the corners and are prevented from readily shifting relative to one another as they are stressed while being passed through the coil window. This increases the strains introduced at the corners and further degrades the core performance. Attempts have been made in the past to reduce the severity of this problem by the use of various forming methods directed toward reducing the space factor at the corners, as for example by the use of insert shims in the corner regions as the core is being wound. Unfortunately, these known methods are either uneconomic or also tend to reduce the space factor in the straight sided legs and yoke regions of the core where a high space factor is desirable. As will be subsequently seen, the physical realizability of the desirable core structure according to the invention is related to the method by which the core is made, and the novel method employed to produce the cores to be hereinafter described is a contributing factor to the superior performance of which these cores are capable. Accordingly, it is a primary object of this invention to provide a wound transformer core of rectangular or square form characterized by a high space factor throughout the straight sided regions of the core, and a space factor at the corners of the core which is sufficiently low that it allows for relatively free interlaminar movement during assembly of the core to its coil structure to thereby prevent the creation of mechanical stresses and strains in the core material and preserve the magnetic properties of an unstressed core.

Another object of this invention is to provide a wound core as aforesaid which is built up of core sections each of which is openable along one side leg thereof but wherein all of the core sections are not openable along the same leg of the built core.

Yet another object of this invention is to provide a novel wound core structure which is built up from a plurality of internested core sections, and wherein the innermost core section acts as a form for the additional core sections built up thereupon.

Still another object of this invention is to provide a novel wound core structure built up of a plurality of core sections each including several laminations of one turn each with their ends disposed in staggered relationship so that closure of the core section forms a plurality of successively offset butt joints in the region of closure.

A further object of this invention is to provide a novel wound transformer core construction as aforesaid wherein the ends of the inner and outer laminations of the core sections are offset from the ends of the immediately adjacent laminations in the same core section by an amount substantially greater than the offset of the ends of the laminations lying between the inner and outer laminations to thereby insure proper mating closure of the ends of each core section.

Another object of this invention is to provide a novel method of making the wound cores according to the invention, and to provide novel apparatus for implementing the method.

The foregoing and other objects of the invention will become clear from a reading of the following specification in conjunction with an examination of the appended drawings, wherein:

FIGURE 1 illustrates a typical wound core according to the invention showing the high space factor in the straight core portions and the relatively lower space factor at all of the corners, and also illustrating the fact that all of the sections from which the core is built up, excepting the innermost section, are jointed along one of the straight side legs of the core, the innermost section being jointed on the opposite core leg;

FIGURE 7 illustrates in perspective view a lamination sizing and cutting apparatus which feeds the core strip material into a sizing jig and cuts each strip to proper size;

FIGURE 8 is an enlarged fragmentary longitudinal vertical sectional view through the apparatus of FIG. 7 as would be seen when viewed along the line 8—8 thereof;

FIGURE 9 is an enlarged fragmentary plan view of the sizing jig portion of the apparatus of FIG. 7 as would be seen when viewed along the line 9—9 thereof;

FIGURE 10 is a vertical sectional view through the jig structure of FIG. 9 as would be seen when veiwed along the line 10—10 thereof;

FIGURE 11 illustrates two strips of material bent into surface engaged concentric circles with their opposite ends respectively abutted, certain geometric relationships being derivable therefrom;

FIGURE 12 illustrates the utilization of the relationships derived from FIG. 11 for the purpose of constructing a core strip sizing jig;

FIGURE 13 illustrates in side elevation a stack of laminations previously cut in the apparatus of FIG. 7 with their right-hand ends displaced from one another preparatory to being bent into a circular loop as one step in the preparation of the core according to the invention;

FIGURE 14 illustrates in perspective an apparatus for forming a rectangular core from a built up core of circular configuration, a circular core being shown in position for forming;

FIGURES 15 through 18 illustrate successive steps in the process of transforming a sectioned wound core of circular form to a core of rectangular form in accordance with the novel method according to the invention.

In the several figures, like elements are denoted by like reference characters.

Figure 1:
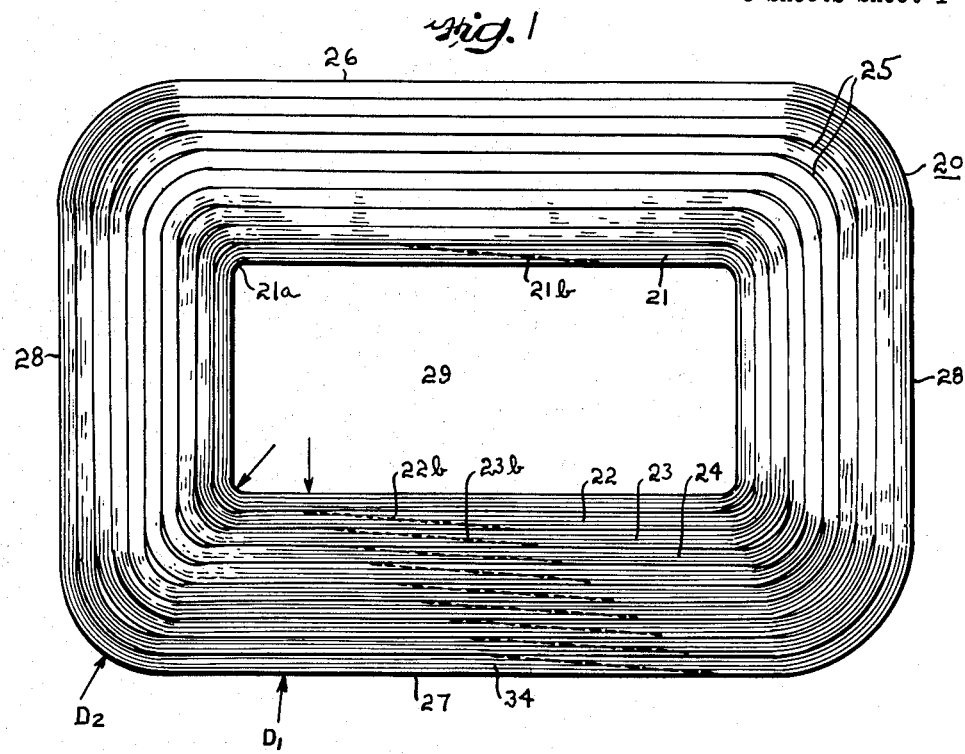

Turning now to a consideration of the drawings, there will be seen in FIGURE 1 a composite core 20 made up of a plurality of internested individual core sections, the inner and outer sections being designated respectively as 21 and 34 while various of the intermediate sections have been designated as 22, 23, and 24. The core is for purposes of illustration shown as of generally rectangular form having a pair of side legs 26 and 27 and a pair of yoke portions 28, the straight-sided legs and yoke portions of the core being joined by the corner regions which are so formed that gaps 25 are observed to intervene the adjacent core sections. In actuality, there also exist slight gaps bewteen the individual laminations 30 of each core section in the corner regions thereof although these are not clearly visible because they would tend to confuse rather than clarify the drawing. The inside periphery of inner core section 21 defines a window 29 within which one leg of the transformer coil structure is disposed in a completed transformer unit.

It should be observed that while the corners 21a of the innermost lamination of the transformer core are rather sharply defined, all of the remaining laminations of the core are of smoothly curved configuration in the corners thereof, the radii of the corner curvature of the laminations increasing outwardly from the innermost lamination. The curvature of the core section corners combined with the interlaminar gaps in the corner regions allow relative movement between adjacent laminations when the core is being built up section by section upon a coil structure, and prevents mechanical strains from being induced in the laminations and thereby preserves the magnetic characteristics of the core.

The interlaminar gaps in the corner regions are provided by proper control of the corner space factor. Space factor is defined as the ratio of the thickness of the material forming the core section to the dimension of the core section taken at a particular point. The thickness of the material forming the core section is equal to the thickness T of one lamination multiplied by the number N of lamination layers in the section. Thus, the space factor for a core leg of the core of FIGURE 1, wherein the leg thickness is shown as $D_1$ and the corner thickness as $D_2$, is defined as $$SF = \frac{NT}{D_1}$$

while the space factor for the core corner is $$SF = \frac{NT}{D_2}$$

In the special case where the core leg has a space factor of 100%, $D_1 = NT$, and the corner space factor may be expressed as $$SF = \frac{D_1}{D_2}$$

By means of a method to be subsequently set forth herein, the looseness in the corners can be controlled to provide a corner space factor in the preferred region of 85% to 95% with an optimum space factor obtaining at about 90%. In contrast to this, wound cores made by the usual methods heretofore known result in core corners having space factors of 96% to 98%, resulting in a corner structure which for all practical purposes is the same as if the corners were rigidly clamped because such high values of space factor prevent corner flexing unless a considerable corner opening force is applied. The necessity for applying such high forces in normal core constructions to effect insertion of the core sections through the window of the coil structure sets up substantial mechanical stress and strain in the corner regions which adversely affect the core magnetic characteristics.

Additionally, it will be appreciated that the usual wound core characterized by a high corner space factor is not completely strain relieved by the usual annealing process. This is so because even though it is true that a core during the annealing process may be strain relieved because of longitudinal expansion of the laminations while they are hot, nevertheless, when the annealed core is cooling down, the outer laminations are those which cool first and are attended by contraction of these laminations which exert a compressional force upon the not as yet cooled inwardly lying laminations and cause the latter to buckle so that a wavy condition is produced in the legs and yoke portions of the core. This waviness is of course highly undesirable and tends to reduce the space factor in the legs and yoke portions of the core, which are precisely those portions of the core in which a high space factor is desired. No such undesired condition occurs in wound cores made according to the present invention, the space factor achieved in the legs and yoke portions being very close to 100%.

Figure 2:
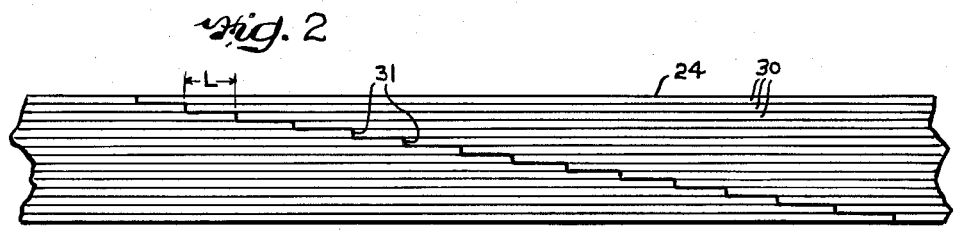
FIGURE 2 is an enlarged fragmentary showing of the stepped butt joint construction of a typical core section.

As best seen in FIGURE 2, the laminations 30 of each of the individual core sections, such as for example core section 24, close into abutting relationship as at 31, and the ends of the laminations adjacent to one another are relatively offset a distance designated in FIGURE 2 as the distance L, so that a staircase type of composite joint for the core section is formed. These joints are shown in FIGURE 1 for example as 21b, 22b, and 23b for the respective core sections 21, 22, and 23. Additionally it will be observed that the core section joints 22b and 23b are longitudinally offset within the core side leg 27 and that this relationship holds for the remainder of the core section joints extending outward through the core side leg 27 to the outer section 34. Thus, the offset joints of the several internested core sections are distributed lengthwise of the core leg 27 to minimize the magnetic reluctance across a plane extending perpendicularly transversely through the leg 27 with the core overall joint length being greater than the thickness of the core leg 27 in which the joint is located. Significantly, it will be observed that the joint 21b for the core section 21 does not lie in the leg 27 but is disposed within the core leg 26. The significance of this feature is most clearly seen from the showing of FIGURE 3 to which attention should be now directed.

Figure 3:
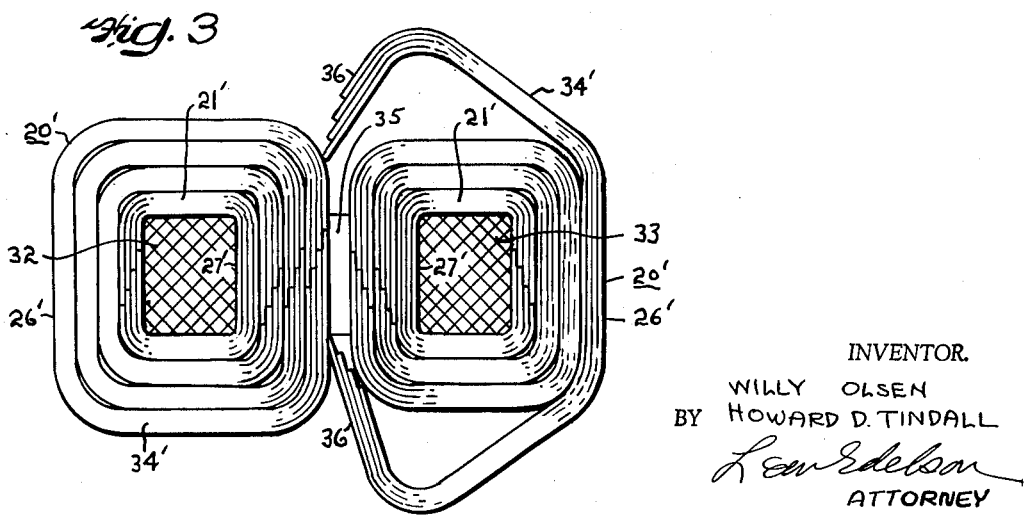
FIGURE 3 illustrates a pair of core sections built through the window of a typical coil structure and illustrating the manner in which the sections are built upon one another to form a complete core.

In FIGURE 3 there will be seen a tranformer coil structure having a pair of legs 32 and 33, the leg 32 being disposed within the window of the left-hand core structure 20' and the leg 33 being disposed within the window of a second right-hand core structure 20' shown in partly assembled condition. It will be observed that the window 35 of the coil structure is substantially filled by the completely assembled side leg 27' of the left-hand core structure 20' and the assembled sections of the leg 27' of the right-hand core 20', there remaining just sufficient space for insertion of the ends 36 of the outer core section 34' of the right-hand core. It will be appreciated that by assembling the individual core sections so that the section gaps are disposed within the window 35 of the coil structure, it is only necessary to feed straight portions of the core section into the window.

Stated somewhat differently, excepting for the innermost section, it is not necessary to pass any of the core section corners through the coil structure window. Obviously, in the illustrated case of FIGURE 3 no core section corner could pass through the window without being practically completely straightened out, the necessity of doing which would cause the severe mechanical strains and stresses in the core material corners previously discussed. Nevertheless, this is exactly what is done in the assembling of most known types of core structures because these cores are almost always constructed so as to be openable through the core yoke region or through the core leg corresponding to those designated as 26'. The difficulty of passing a core section corner through the coil window becomes increasingly more acute as the window size is reduced due to the buildup of the core structure.

It will be observed however in both the showings of FIGURE 1 and FIGURE 3 that the innermost core sections 21 and 21' respectively each has a gap region disposed in the leg opposite to that in which the gap regions of the other core sections are placed. The reason for this is that since the inner core section is in effect the form on which the remainder of the core sections are placed and determines the initial size of the core window, it is almost essential that there should be a guarantee that the gap of the inner core section be completely and properly closed. By placing the gap of the inner section on the outside of the coil leg, and not in the window, such proper closing of the gap can be assured since the joint is clearly visible and easily manipulable when placed in this location. Further, this orientation of the inner core section joint does not pose a real problem with regard to the installation of the inner core section about the coil form because the coil structure window is completely open at this time and the coil section corners may be rather easily passed therethrough without any material flexing or straightening thereof, so that the mechanical stress situation, which becomes progressively worse as the cores are built up, does not really exist for the innermost core section.

Figure 4:
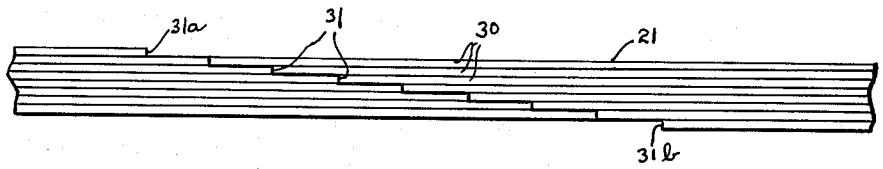
FIGURE 4 illustrates an enlarged fragmentary view of a core section joint in which an improper closure condition may occur when the ends of the laminations are offset from one another by equal amounts.
Figure 5:
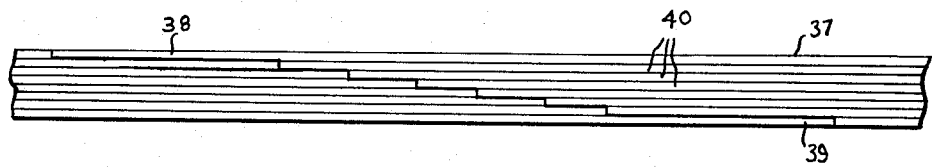
FIGURE 5 illustrates an increased offset of the ends of the inner and outer laminations of a core section by means of which it may be readily determined when a proper closure of the joint has been effected.
Figure 6:
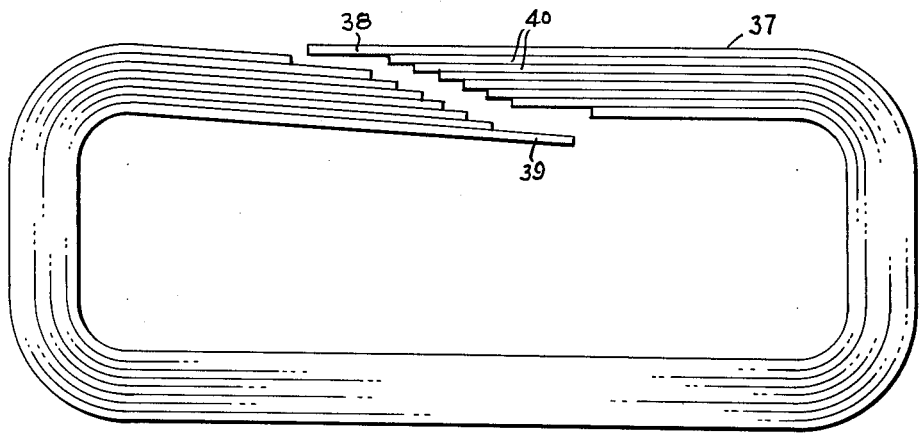
FIGURE 6 illustrates a complete core section having laminations whose ends are offset in the manner illustrated in FIG. 5, the joint being illustrated in a partially opened condition for clarity of viewing.

While FIGURE 3 shows the typical core sections as being each composed of four laminations, this is by no means a necessary condition or limitation and the individual core sections may be formed with as many laminations as are deemed desirable. In this regard, FIGURE 2 illustrates the core section 24 as being built up of 15 laminations, whereas FIGURES 4, 5 and 6 illustrate core sections as being built up of eight laminations. Moreover, it is not necessary that all of the core sections of any given composite core should contain the same number of laminations.

During the process of building up a composite transformer construction by installation of the core sections to the coil structure, as for example seen in FIGURE 3, it will be appreciated that as the window of the coil structure becomes progressively smaller due to installation of successive core sections, it becomes progressively more difficult for the assembler to be certain that the joints of each section have properly closed and that an offset condition such as that shown in FIGURE 4 has not occurred. In FIGURE 4 it will be observed that an improper closure of the joint has occurred due to offsetting of the ends of laminations 30 so that the ends 31a and 31b of the inner and outer laminations are not in abutment with the opposite ends of the particular lamination of which they form a part. The window area of such an improperly closed joint is of course somewhat larger than it should be, and the various laminations of adjacent core sections may not be in as close contact as they should be. Also, when the laminations are not each properly aligned, additional strains and stresses are induced in the core structure. Further, the space factor is lowered and the operation of the core is adversely affected due not only to the lowered space factor but also due to the actual reduction of the core cross-section in the region of the improperly closed joint.

This type of undesirable condition can even arise in those cases where the core section is properly installed and the joint completely closed by virtue of the fact that when the installer removes his hands from the core section when has just been placed about the coil there is a tendency for a slight springback to occur and the joint then opens sufficiently to fall into the condition shown in FIGURE 4. When the next core section is then installed it is quite possible for this condition to go undetected because the outer core section will have sufficient looseness in the corners to permit a closing of its own joint. Consequently the finished core structure will not be as efficient as it could be. This undesirable condition may be eliminated by forming each core section so that its joint structure takes the form of the preferred embodiment illustrated in FIGURES 5 and 6.

FIGURE 5 illustrates a typical core section generally designated as 37 having inner and outer laminations 38 and 39 and a plurality of intermediate laminations 40. The ends of the intermediate laminations 40 are longitudinally offset relative to one another by a predetermined fixed amount to provide a regular stepped arrangement of the lamination individual butt joints. However, the inner and outer laminations 38 and 39 are observed to each have their ends offset relative to the next adjacent intermediate lamination 40 by an amount substantially in excess of the regularly occurring offset of the ends of the intermediate laminations relative to each other. With such an arrangement it will be appreciated that any springback which may take place when the core section is assembled into the coil window will not permit the ends of the laminations to become laterally shifted relative to one another because any such springback is insufficient to cause the ends of the laminations 38 and 39 to override the ends of the next adjacent inner laminations. Therefore, when the next core section is placed in position by the assembler and its joint is closed, the joint core section 37 will itself close properly as shown in FIGURE 5.

Understanding now the novel structure of the wound transformer core according to the invention, the method of assembling such a core into an associated coil structure and the improved performance of which the core is capable, attention should now be directed to the remainder of the figures for an understanding of the method of making the novel core structure and the apparatus employed for carrying out the method.

Each of the rectangular core sections which together make up the composite core shown in FIGURE 1 is made from a plurality of pre-cut straight strips of core material of graduated length. The strips are stacked and bent into a circle with the shortest strip occupying the inside position in the loop and with the longest strip occupying the outside position in the closed loop. The loop sections are then placed in a press and the circular cross-section of the core is then formed into a rectangular section. The formed core is then annealed and disassembled section by section for subsequent installation onto a coil structure.

A part of the apparatus utilized in the making of the cores is a jig structure which includes an angle block 41 illustrated in FIGURES 7 through 10. The angle block 41 is provided with a sloping underface 42 which slants upward from a horizontal bed 43 of the strip sizing and cutting apparatus designated generally as 44 and shown in some detail in FIGURE 7. The angle which the underface 42 of the block 41 makes with the horizontal bed 43 is quite important since it is this angle which determines the difference in length of successively cut strips of core material. There exists a critical angle of orientation which when employed causes successively cut strips to be stackable and formed into a circle so that opposite ends of each strip in the stack will exactly abut one another. Orientation angles larger than the critical angle reduce the difference in length between successively cut strips and prevent abutment of the ends of all laminations disposed radially outward of the innermost lamination when all of the strips are bent into a circular configuration. Conversely, angles less than the critical angle increase the difference in length between successively cut strips and will prevent the ends of all laminations disposed radially inward from the outermost lamination from closing so long as the laminations are maintained in surface to surface contact throughout their length. The magnitude of the critical angle may be determined in the following manner.

Referring to FIGURE 11 there will be seen a pair of strips $S_1$ and $S_2$ each of thickness T and folded into internested circular form with the ends of each strip brought into abutment. The strip $S_1$ has a mean diameter $D_1$ and a mean circumference $C_1$ while the strip $S_2$ has a mean diameter $D_2$ and mean circumference $C_2$. The strips $S_1$ and $S_2$ of course correspond to any two adjacent laminations of the core to be constructed, these laminations being in circular form in the configuration assumed prior to rectangular forming. It is apparent that the strip $S_2$ must be longer than the strip $S_1$ in order that its ends shall be able to close, and it is necessary to determine what the difference in strip length should be so that successive strips of properly increasing length may be cut to form the core. The difference in length between the strips $S_1$ and $S_2$ is the difference between their mean circumferences $C_1$ and $C_2$. The mean circumference of $S_1$ is $$C_1 = \pi D_1$$

whereas the mean circumference of $S_2$ is $$C_2 = \pi D_1 + 2\pi T$$

Therefore $$C_2 - C_1 = \Delta C = 2\pi T$$

From this last relationship it is observed that the difference in length $\Delta C$ between any two laminations is a function of the lamination thickness T, which is what one would expect. What is not apparent is that a simple device may be constructed which eliminates the necessity for the calculation of a continuous series of numbers which will be different for each different thickness of core material which it is desired to use. The geometric relationship illustrated in FIGURE 12 provides the basis for the construction of the jig angle block 41, previously referred to, which automatically establishes the proper difference in length between successively cut strips of core material independently of the strip thickness.

In FIGURE 12 it will be observed that the horizontal line 45 and the upwardly inclined line 46 define therebetween an acute angle $\theta_c$. Also shown are a pair of rectangles 47 and 47a each of which is of a height designated as T. The left-hand end of the rectangle 47a is positioned to the right of the left-hand end of the rectangle 47 by an amount equal to $2\pi T$ or $2\pi$ times the height of either of the rectangles. The inclined line 46 is pivoted about the apex 48 of the angle $\theta_c$ until it is tangent to the upper lefthand corners of the rectangles 47 and 47a, as illustrated at 49 and 50. Thus $$\mathrm{Tan}\ \theta_c = \frac{T}{2\pi T} = \frac{1}{2\pi}$$

and $$\theta_c = 9° \ 2.6'$$

It should be noted that the tangent function of $\theta_c$ is a constant and hence the angle $\theta_c$ is completely independent of the height T of the rectangles 47 and 47a. By considering the rectangles 47 and 47a of FIGURE 12 to be the ends of any two core lamination strips each of thickness T, and recalling from the relationship developed from FIGURE 11 that the difference in length between successively cut strips should be $2\pi T$ to obtain a proper closure of the joints, it will be now appreciated that an angle block jig may be constructed for the proper sizing of successive strips of core material. However, since the critical angle $\theta_c$ defines the jig block angle which theoretically results in exact abutment of opposite ends of each lamination of a stack bent into circular form together with the maintenance of complete surface to surface contact between adjacent laminations, it will be appreciated that when the circular stack is rectangularly formed there would exist a 100% space factor at all points of the core cross-section. Since the novel core construction according to the invention is characterized by looseness in the corners, it is necessary that the difference in length between successively cut strips should be slightly longer than that which would result from the utilization of a jig inclined at the derived critical angle $\theta_c$. This is achieved by reducing the actual angle of the jig block below the critical angle, an actual angle of approximately 8½° having been found to be satisfactory.

By so reducing the angle $\theta_c$ of the jig block to below its critical value, there is obtained a degree of looseness between successive strips in the laminated core structure sufficient to render differences in length of the successive strips inconsequential due to variations in thickness thereof. As will be apparent, the essential requirement is that each lamination strip forming a turn of the core be properly butt-jointed and by providing sufficient looseness between successive turns, minor variations in the lengths of the strips due to thickness variations will not prevent proper butt-jointing of their ends but instead will result only in varying in minor degree the looseness between certain successive turns of the core structure.

Returning now to FIGURES 7 through 10, there will be seen the strip sizing and cutting apparatus designated generally as 44 having a remote end section 51 within which is rotatably held a coil 52 of core strip material 53. The strip material 53 is fed off of the roll and over a roller feeder 54 to a vertically reciprocable shear 55, the strip material 53 being formed into a loop 56 prior to entering the shear in order to maintain a positive longitudinal forward bias tending always to force the forward end of the strip against the sloping underface 42 of the jig angle block 41 secured upon the near end section 57 of the apparatus 54. The bed 43 upon which the strip material is fed into the jig block 41 is formed from a pair of I-bars 58 disposed parallel to one another and spaced apart in the manner best seen in the showing of FIGURE 10. The underside marginal edges of the jig angle block 41 are seated upon the upper flanges 59 of the I-bars 58 with the depending tongue 60 of the angle block extending downward into the slot between the I-bars. The angle block 41 is vertically apertured to receive a pair of socket head bolts 61 of sufficient length to extend below the bottom of the jig block tongue 60 and threadingly engage a clamping plate 62. In operation, the jig angle block 41 is slipped longitudinally between the I-bars 58 until it is positioned the proper distance from the punch 55 to cause the desired length of the strip to be cut, this strip being designated as 63 in the showing of FIGURE 8 and being the longest strip of the stack. The bolts 61 are then tightened to secure the angle block 41 in fixed position by drawing up the clamping plate 62. The remainder of the strips, designated as 64, 65 and 66 will then be automatically cut to the proper length by virtue of the angle of the jig block 41. FIGURE 8 shows the fourth strip 66 about to be cut by the shear 55. A side edge guide 67 in the form of an angle bar is seen also in FIGURES 7, 9 and 10 to aid in aligning the side edges of the core strip being cut.

When the strips for a given core section or core have been cut they are removed from the sizing and cutting apparatus 44 and flat stacked in the manner shown in FIGURE 13. This particular arrangement of stacking is effected by end shifting the strips relative to one another so that the ends of the adjacent strips are offset by an amount designated as L in FIGURE 13. This of course causes the opposite ends of these strips to be relatively offset by an amount equal to $\Delta C+L$. The end offset distance L is a function of the thickness T of the core strip and is chosen to be large relative to the strip thickness in order to minimize the reluctance introduced by the joint created by abutment of opposite ends of each strip of core material. The $L/T$ ratio is normally chosen to fall between a lower limit of 6 to 1 and an upper limit of 10 to 1, a ratio of 8 to 1 being completely satisfactory for most purposes. Of course, the step ratio may be modified as desired to provide the preferred type of joint configuration illustrated in FIGURES 5 and 6.

With the stack of strip material positioned as illustrated in FIGURE 13, clamping pressure is applied transversely, as for example at the points indicated by the arrows A—A, to hold the stack together while it is bent into circular form to thereby form a circular section, as for example designated by any one of the sections 68 through 71 shown in FIGURE 15. As shown in FIGURE 15 it is also to be understood that a plurality of sections may be stacked and simultaneously circularly formed as for example the sections 69, 70 and 71, or alternatively the sections may be individually formed and then internested to provide the composite array shown in FIGURE 15 and including the section 68. It should be noted that the joints of the sections 69, 70 and 71 are located in a manner shown for the joint of the side leg 27 of the core shown in FIGURE 1, and that the joint of the section 68 lies in the opposite leg. Further, the orientation of the central forming mandrel 72 relative to the joints of the core sections 68 through 71 should be noted. The significance of this orientation will appear shortly hereinafter when the operation of the forming apparatus shown in FIGURE 14 is understood.

The forming apparatus of FIGURE 14 includes a flat bed or table 73 upon which are fixedly mounted a stop block 74 and three hydraulically actuated piston cylinders 75, 76 and 77. The cylinders 76 and 77 are spaced apart with their longitudinal axes in alignment, and the cylinder 75 and stop block structure 74 are similarly aligned along an axis perpendicular to the alignment axis of the cylinders 76 and 77. The piston of each of the cylinders is actuated by a hydraulic pressure system (not shown) coupled thereto through the fittings 78 and hoses 79. The actuatable pistons which are reciprocable within the cylinders 75, 76 and 77 have affixed to their outer ends rams 75a, 76a and 77a respectively, only the ram 77a being visible in the showing of FIGURE 14. Disposed flatwise against each of the rams is a forming plate 80, 81 or 82, a similar forming plate 83 being held in fixed position by the stop block 74. The forming plates 82 and 83 are employed to elongate the circular core structure with the length of these plates defining the ultimate overall length of the rectangular core to be formed. The forming plates 80 and 81 are the end forming plates and transform the core from an elongated oval into the final rectangular form. The core shape transformation is effected by the apparatus in FIGURE 14 in the following manner.

A circular core stack 84, such as the one shown in plan view in FIGURE 15 is placed on the table 73 between the forming plates, and a central forming mandrel 72 is placed in the window 85 of the core stack, as also shown in FIGURE 15. The core stack is prevented from spontaneously unwinding by means of the tape strips 88. With the core stack 84 so disposed, the piston of the cylinder 75 is actuated to drive the ram 75a toward the stop block 74 and thus to move the forming plate 82 toward the forming plate 83. As the ram 75 moves the forming plate 82 toward the forming plate 83, the core stack 84 begins to elongate in the manner shown in FIGURE 16. It should be noted that the corners of the central forming mandrel 72 do not impose any stresses or strains upon those portions of the laminations which form the corners of the core or core sections. The movement of the ram 75a continues until the conditions of FIGURE 17 obtain wherein it will be seen that the core stack 84 is now tightly compressed between the forming plates 82 and 83 on the outside and the central forming mandrel 72 in the window region. The significance of the orientation of the central mandrel 72 is now observed to reside in the fact that all of the joints of the core stack 84 are clamped and there exists no possibility of overriding of the ends of adjacent laminations or the opening of the joints when the forming plates 80 and 81 begin to move inward.

Figure 18:
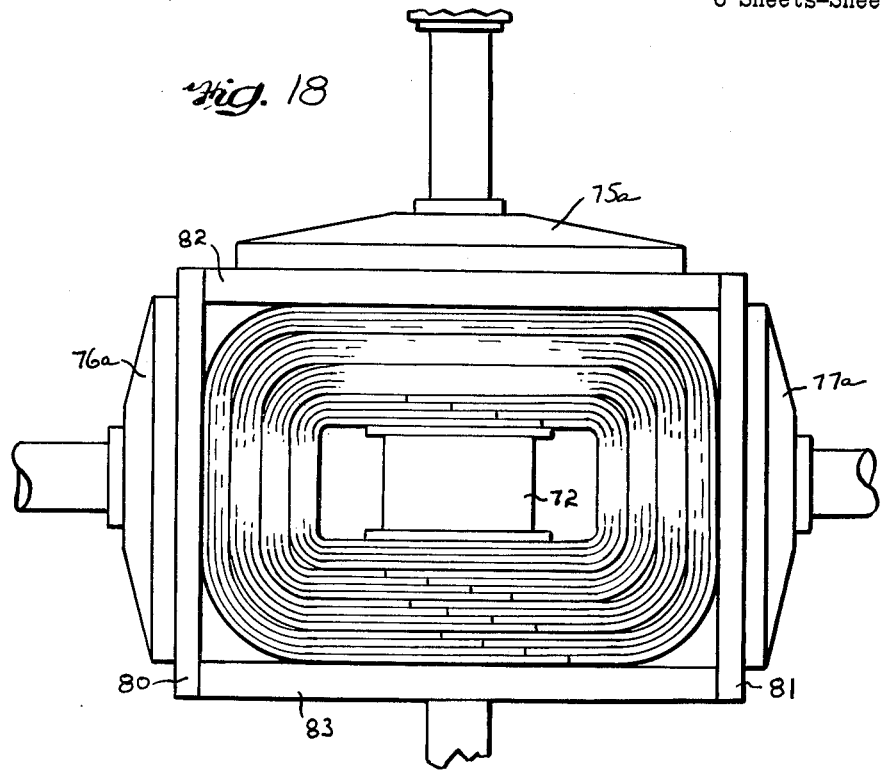
Figure 19:
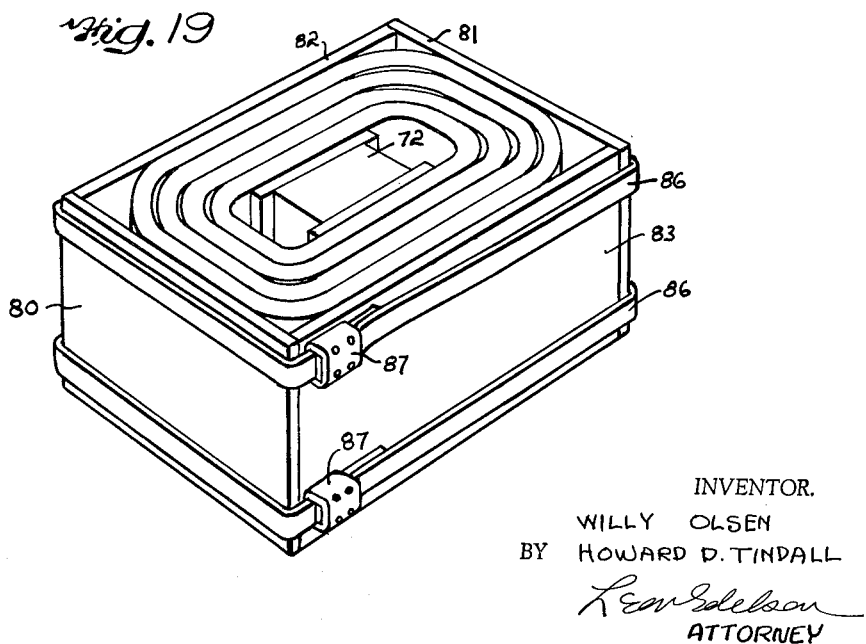
FIGURE 19 illustrates the formed rectangular core after removal from the press apparatus shown in FIG. 12 and ready for annealing.

The tight clamping effected by the forming plates 82 and 83 together with the forming mandrel 72 causes all of the excess length of material in each of the core strips to run outward toward the ends, and when the forming plates 80 and 81 are moved inward as shown in FIGURE 18, the clamping pressure exerted on the now defined yoke portions, or short legs, of the formed core causes the excess material to be forced out into the corner regions to thereby lower the space factor at the corners. It now merely remains to apply the securing bands 86 and clamps 87 to the outer periphery of the forming plates, retract the rams 75a, 76a and 77a and remove the banded formed transformer structure from the forming apparatus. After annealing, the banding clamps 87 are removed and the annealed core may be released from the forming plates and the central mandrel 72 removed to reveal a finished core structure as illustrated in the showing of FIGURE 1.

While the method of and apparatus for making the transformer cores according to the invention have been described in connection with the production of cores formed of a plurality of internested single turn laminations, it is to be understood that the forming apparatus shown in FIGURE 14 and the forming method as carried out in FIGURES 15 through 18 may be utilized in the making of complete cores or core sections wound from a single continuous strip of core material or from a plurality of strips of core material each of which is formed into as many turns as the strip length will permit. Further, it will be understood that the term "wound" as employed in the foregoing specification and in the appended claims is intended to cover cores and/or core sections in which the laminations thereof are formed of separate lengths of strip material successively arranged in concentric relation or of a continuous length thereof and wherein the strip material is bent lengthwise so that the plane of its surface is always parallel to the axis of the core.

Having now described our invention in connection with a particularly illustrated embodiment of a core structure and the method and apparatus utilized in producing the same, it will be appreciated that modifications of our invention may now occur from time to time to those persons normally skilled in the art without departing from the essential scope or spirit of the invention, and accordingly it is intended to claim the same broadly as well as specifically as indicated by the appended claims.

What is claimed as new and useful is:

1. A nested transformer core construction having a pair of yokes and a pair of legs comprising in combination, a plurality of internested rectangular core sections each of which is formed from a plurality of internested single turn laminations which latter each have their opposite ends in aligned coplanar relation to provide therein a joint when the core section is in closed rectangular form, the joints of the laminations of each section being successively offset from one another so that they are distributed lengthwise of one of the legs of the rectangular section and conjointly define a section joint of longer length than the thickness of the core section leg in which the joint is disposed, the yokes and legs of each core section being substantially completely straight and characterized by a space factor of substantially 100%, said core section yokes and legs being joined by corner portions which are characterized by a space factor lying in the range of 85% to 95%, said plurality of core sections being so internested that the section joint of the innermost section is disposed in one of the legs of the composite core while the section joints of the remaining sections are disposed in successively offset partially overlying relation in the other leg of the composite core and define a composite joint in that latter leg which is of longer length than the thickness of the composite core leg in which the composite joint is disposed.

2. A nested transformer core construction having a pair of yokes and a pair of legs comprising in combination, a plurality of internested rectangular core sections each of which is formed from a plurality of internested single turn laminations which latter each have their opposite ends in aligned coplanar relation to provide therein a joint when the core section is in closed rectangular form, the joints of the laminations of each section being successively offset from one another so that they are distributed lengthwise of one of the legs of the rectangular section and conjointly define a section joint of longer length than the thickness of the core section leg in which the joint is disposed, the yokes and legs of each core section being substantially completely straight and characterized by a space factor of substantially 100%, said core section yokes and legs being joined by corner portions which are characterized by a spaced factor of substantially 90%, said plurality of core sections being so internested that the section joint of the innermost section is disposed in one of the legs of the composite core while the section joints of the remaining sections are disposed in successively offset partially overlying relation in the other leg of the composite core and define a composite joint in that latter leg which is of longer length than the thickness of the composite core leg in which the composite joint is disposed.

3. A nested transformer core construction having a pair of yokes and a pair of legs comprising in combination, a plurality of internested rectangular core sections each of which is formed from a plurality of internested single turn laminations which latter each have their opposite ends in aligned coplanar relation to provide therein a joint when the core section is in closed rectangular form, the joints of the laminations of each section being successively offset from one another so that they are distributed lengthwise of one of the legs of the rectangular section and conjointly define a section joint of longer length than the thickness of the core section leg in which the joint is disposed, the joints of the innermost and outermost laminations of at least one of the core sections being offset from the joints of the immediately adjacent laminations of the same section by an amount substantially greater than the offset of the joints of the laminations lying therebetween, the yokes and legs of each core section being substantially completely straight and characterized by a space factor of substantially 100%, said core section yokes and legs being joined by corner portions which are characterized by a space factor lying in the range of 85% to 95%, said plurality of core sections being so internested that the section joint of the innermost section is disposed in one of the legs of the composite core while the section joints of the remaining sections are disposed in successively offset partially overlying relation in the other leg of the composite core and define a composite joint in that latter leg which is of longer length than the thickness of the composite which is of longer length than the thickness of the composite core leg in which the composite joint is disposed.

4. A nested transformer core construction having a pair of yokes and a pair of legs comprising in combination, a plurality of internested rectangular core sections each of which is formed from a plurality of internested single turn laminations which latter each have their opposite ends in aligned coplanar relation to provide therein a joint when the core section is in closed rectangular form, the joints of the laminations of each section being successively offset from one another so that they are distributed lengthwise of one of the legs of the rectangular section and conjointly define a section joint of longer length than the thickness of the core section leg in which the joint is disposed, said plurality of core sections being so internested that the section joint of the innermost section is disposed in one of the legs of the composite core while the section joints of the remaining sections are disposed in successively offset partially overlying relation in the other leg of the composite core and define a composite joint in that latter leg which is of longer length than the thickness of the composite core leg in which the composite joint is disposed.

5. A nested transformer core construction having a pair of yokes and a pair of legs comprising in combination, a plurality of internested rectangular core sections each of which is formed from a plurality of internested single turn laminations which latter each have their opposite ends in aligned coplanar relation to provide therein a joint when the core section is in closed rectangular form, the joints of the laminations of each section being successively offset from one another so that they are distributed lengthwise of one of the legs of the rectangular section and conjointly define a section joint of longer length than the thickness of the core section leg in which the joint is disposed, the joints of the innermost and outermost laminations of at least one of the core sections being offset from the joints of the immediately adjacent laminations of the same section by an amount substantially greater than the offset of the joints of the laminations lying therebetween, said plurality of core sections being so internested that the section joint of the innermost section is disposed in one of the legs of the composite core while the section joints of the remaining sections are disposed in successively offset partially overlying relation in the other leg of the composite core and define a composite joint in that latter leg which is of longer length than the thickness of the composite core leg in which the composite joint is disposed.

References Cited by the Examiner

UNITED STATES PATENTS

| | | | |
|---|---|---|---|
| 2,260,182 | 10/1941 | Knutsen et al. | 83—29 |
| 2,344,294 | 3/1944 | Evans | 336—217 X |
| 2,523,071 | 9/1950 | Somerville | 336—217 X |
| 2,649,886 | 8/1953 | Palmer | 153—13 |
| 2,671,951 | 3/1954 | Sliwiak | 29—155.61 |
| 2,702,936 | 3/1955 | Hurt | 336—214 X |
| 2,843,173 | 7/1958 | DeVoss | 153—13 |
| 2,892,169 | 6/1959 | Teague et al. | 336—213 |
| 2,942,511 | 6/1960 | Moynihan | 83—29 |
| 2,958,931 | 11/1960 | Hurt | 29—155.61 |
| 3,025,483 | 3/1962 | Treanor | 336—213 |
| 3,107,415 | 10/1963 | Ellis | 336—216 X |

ROBERT K. SCHAEFER, *Primary Examiner.*

JOHN F. BURNS, *Examiner.*

WALTER M. ASBURY, *Assistant Examiner.*